(12) United States Patent
Fang et al.

(10) Patent No.: US 8,164,339 B2
(45) Date of Patent: Apr. 24, 2012

(54) APPARATUS AND SYSTEM FOR GEOSTEERING AND FORMATION EVALUATION UTILIZING IMPROVED ANTENNAS

(75) Inventors: Sheng Fang, Houston, TX (US); Tsili Wang, Katy, TX (US); Jack Signorelli, Cypress, TX (US); Roland E. Chemali, Humble, TX (US)

(73) Assignee: Baker Hughes Incorporated, Houston, TX (US)

( * ) Notice: Subject to any disclaimer, the term of this patent is extended or adjusted under 35 U.S.C. 154(b) by 713 days.

(21) Appl. No.: 12/135,639

(22) Filed: Jun. 9, 2008

(65) Prior Publication Data

US 2009/0301781 A1    Dec. 10, 2009

(51) Int. Cl.
*G01V 3/18* (2006.01)
*G01V 3/20* (2006.01)
*G01V 3/28* (2006.01)

(52) U.S. Cl. .................. 324/356; 324/338; 324/339

(58) Field of Classification Search .......... 324/338–339, 324/356
See application file for complete search history.

(56) References Cited

U.S. PATENT DOCUMENTS

| 5,138,263 A | 8/1992 | Towle |
| 5,530,358 A | 6/1996 | Wisler et al. |
| 5,869,968 A | 2/1999 | Brooks et al. |
| 5,939,885 A | 8/1999 | McClure et al. |
| 6,957,708 B2 | 10/2005 | Chemali et al. |
| 7,057,392 B2 * | 6/2006 | Wang et al. ............. 324/338 |
| 7,723,991 B2 * | 5/2010 | Signorelli et al. ......... 324/338 |
| 2005/0218898 A1 | 10/2005 | Fredette et al. |

FOREIGN PATENT DOCUMENTS

EP      0778474 A2    11/1997

OTHER PUBLICATIONS

Goswami, et al. "Optimal Coil Design for Well-Logging Applications". Antennas and Propagation Society International Symposium, 2001. IEEE. vol. 3, Issue. 2001 pp. 176-179.
T.M. de Swiet. "An R.F. Sensor for Logging-While-Drilling Geophysical Measurements". Progress in Electromagnetics Research, PIER 17, 1-24, 1997. pp. 1-24.
Radzinski, et al. "New Technology High Temperature and High Pressure MWD & LWD System". Proceedings World Geothermal Congress 2005. Antalya, Turkey, Apr. 24-29, 2005. pp. 1-8.
Leading Oilfield Technology. www.sondex.com. pp. 1-18.
Alvarado, et al. "Nuclear Magnetic Resonance Logging While Drilling". Oilfield Review. Summer 2003. pp. 40-51.
International Search Report and Written Opinion, Mailed Jan. 19, 2010, International Appln. No. PCT/US2009/046141, Written Opinion 6 Pages, International Search Report 4 Pages.

* cited by examiner

*Primary Examiner* — Reena Aurora
(74) *Attorney, Agent, or Firm* — Cantor Colburn LLP

(57) ABSTRACT

An apparatus for measuring one or more earth formation properties during applications including formation evaluation and geosteering applications is provided. The apparatus includes: an elongated body; at least one recessed portion on a periphery of the elongated body; an electrically conductive coil forming a closed loop, at least a portion of the coil extending through the at least one recessed portion; and a u-shaped magnetically permeable and non-conductive material disposed between the coil and the at least one recessed portion, the u-shaped material partially surrounding the coil in the at least one recessed portion. A system for measuring one or more properties of an earth formation is also provided.

20 Claims, 15 Drawing Sheets

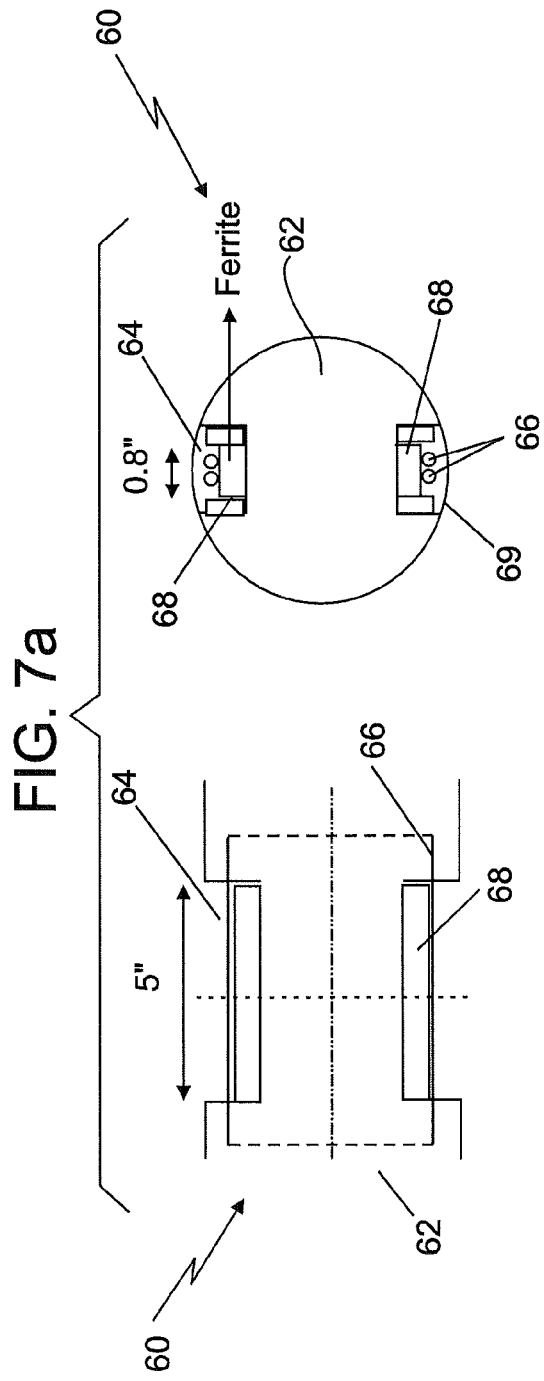
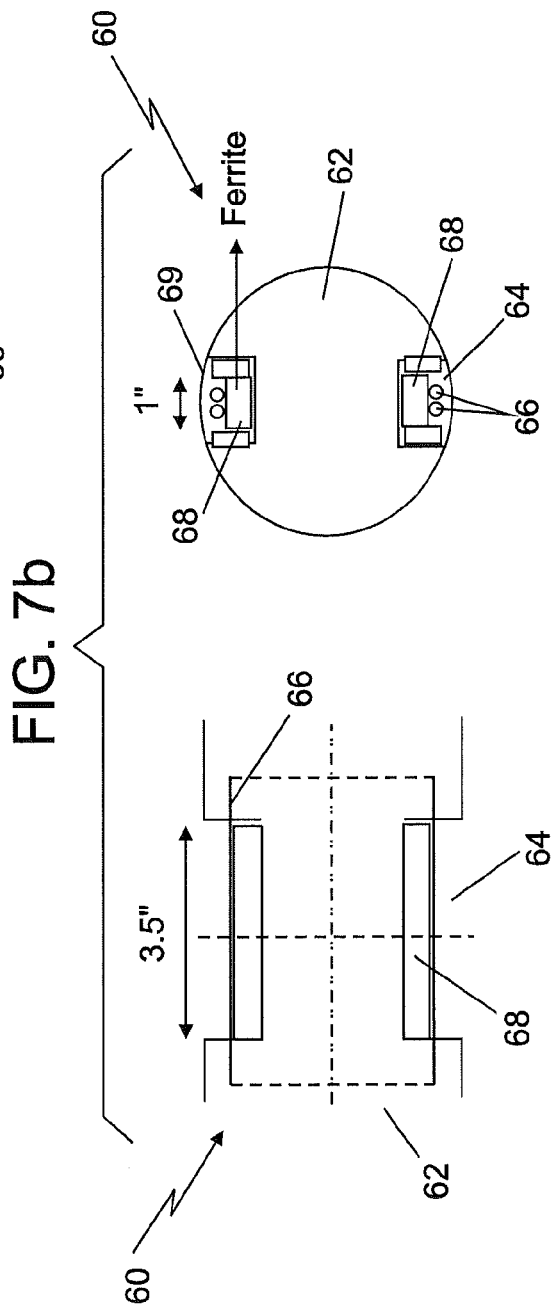

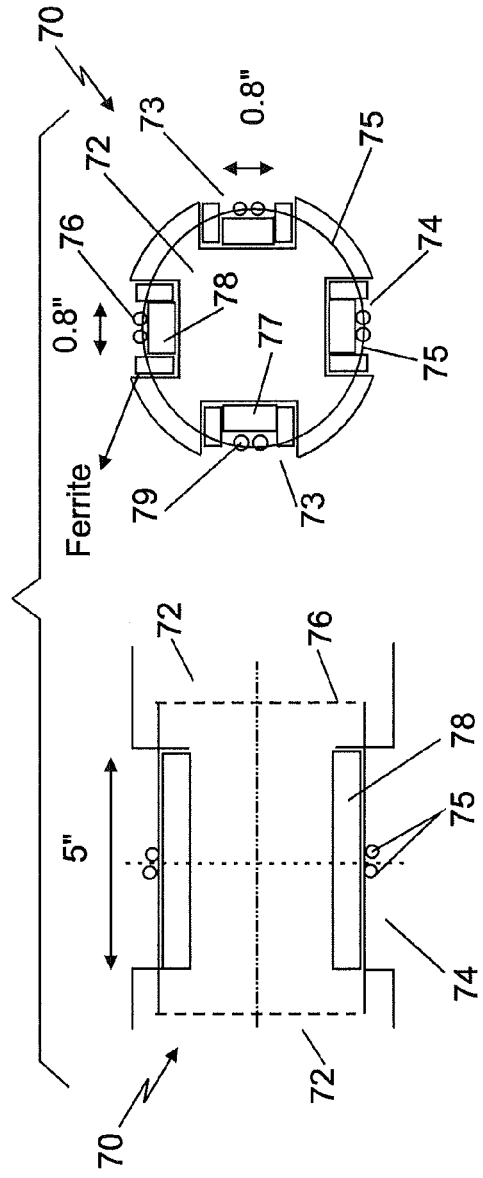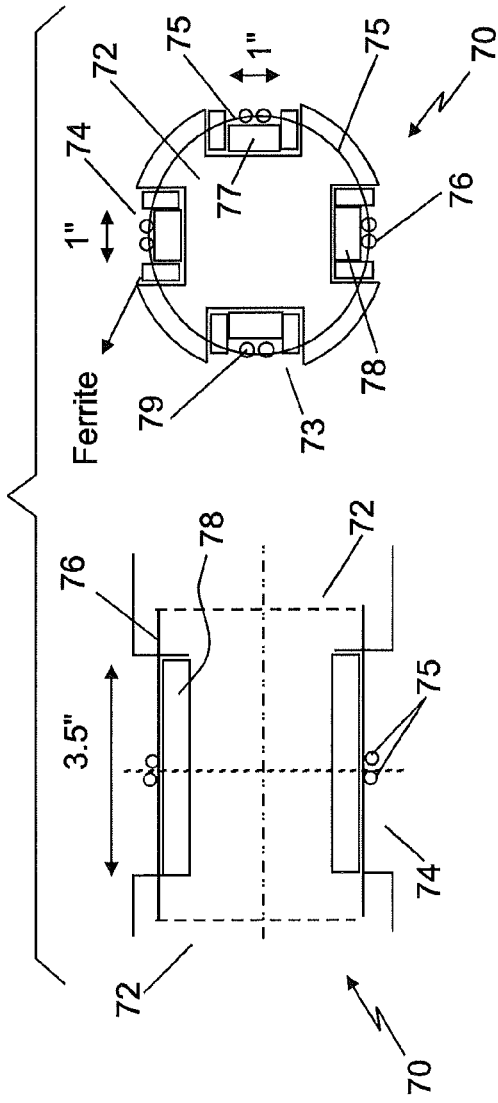

APPARATUS AND SYSTEM FOR GEOSTEERING AND FORMATION EVALUATION UTILIZING IMPROVED ANTENNAS

BACKGROUND

Various formation evaluation (FE) tools are used in hydrocarbon exploration and production to measure properties of geologic formations during or shortly after the excavation of a borehole. The properties are measured by formation evaluation tools and other suitable devices, which are typically integrated into a bottom hole assembly (BHA).

Some FE tools include antennas that are used during FE operations, such as logging-while-drilling (LWD) and geosteering operations. Examples of such antennas include so-called "slot" design antennas, such as "Z-type" antennas ("Z-antennas") typically used in multi-frequency and multi-spacing propagation resistivity ("MPR") tools and "X-type" antennas ("X-antennas") typically used in azimuth propagation resistivity ("APR") tools.

Current LWD antennas require a minimum slot length in order to generate a sufficiently strong signal, and thus impact space requirements and sizes of associated downhole tools. Furthermore, the lengths of such antennas make it infeasible to incorporate differing types of tools, such as MPR and APR tools, together to improve LWD operations such as geosteering operations.

SUMMARY

Disclosed herein is an apparatus for measuring one or more earth formation properties during applications including formation evaluation and geosteering applications. The apparatus includes: an elongated body; at least one recessed portion on a periphery of the elongated body; an electrically conductive coil forming a closed loop, at least a portion of the coil extending through the at least one recessed portion; and a u-shaped magnetically permeable and non-conductive material disposed between the coil and the at least one recessed portion, the u-shaped material partially surrounding the coil in the at least one recessed portion.

Also disclosed herein is a system for measuring one or more properties of an earth formation. The system includes: a drillstring configured to support a drilling device; and a measurement tool disposed on the drillstring and including at least one antenna. The antenna includes: an elongated body; at least one recessed portion on a periphery of the elongated body; an electrically conductive coil forming a closed loop, at least a portion of the coil extending through the at least one recessed portion; and a u-shaped magnetically permeable and non-conductive material disposed between the coil and the at least one recessed portion, the u-shaped material partially surrounding the coil in the at least one recessed portion.

BRIEF DESCRIPTION OF THE DRAWINGS

The following descriptions should not be considered limiting in any way. With reference to the accompanying drawings, like elements are numbered alike:

FIGS. 7a and 7b depict further exemplary embodiments of an antenna;

FIGS. 10a and 10b depict additional exemplary embodiments of an assembly including multiple co-located antennas;

DETAILED DESCRIPTION

A detailed description of one or more embodiments of the disclosed system and method are presented herein by way of exemplification and not limitation with reference to the Figures.

Figure 1:
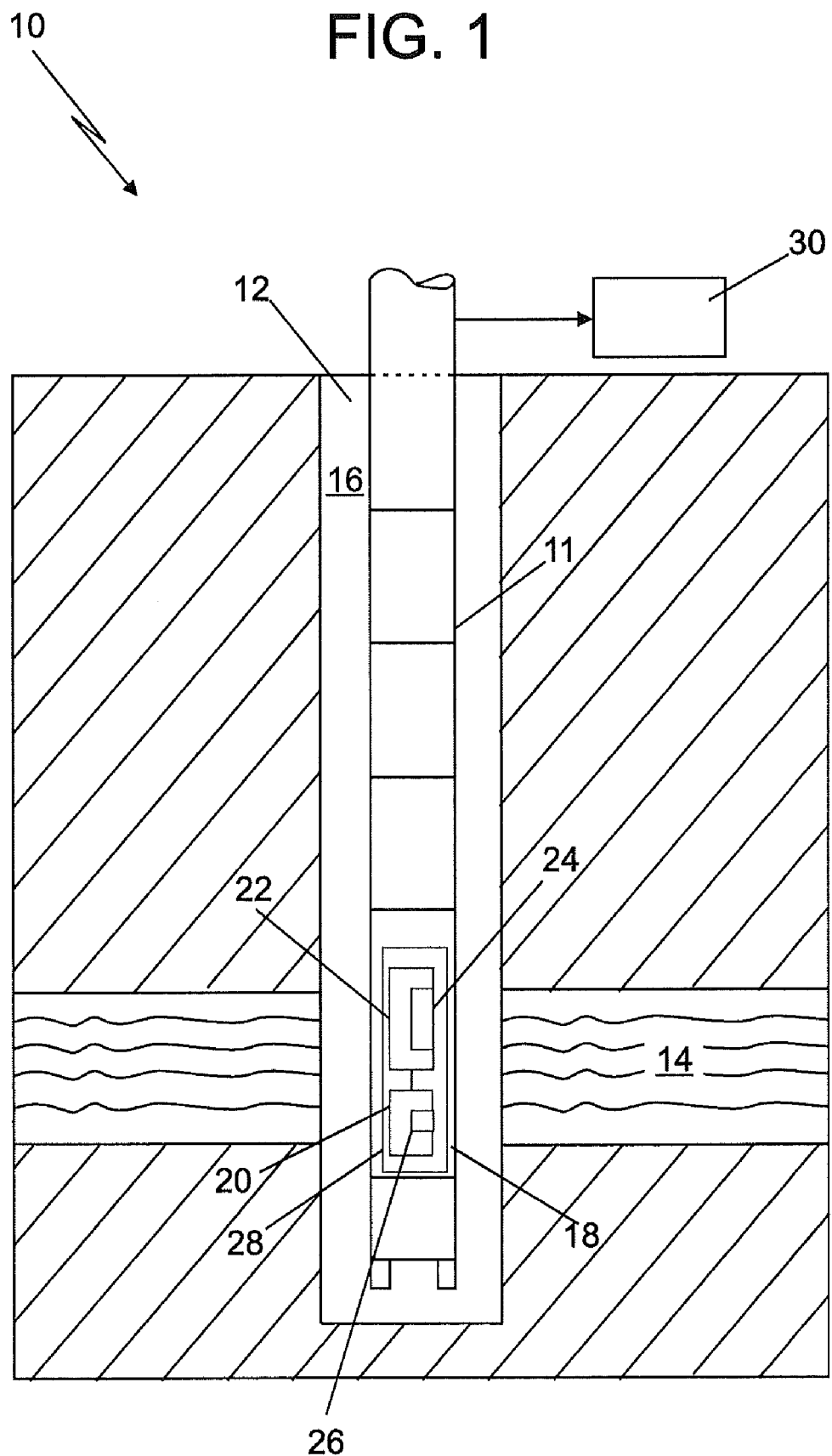
FIG. 1 depicts an exemplary embodiment of a logging system.

Referring to FIG. 1, an exemplary embodiment of a well logging system 10 includes a drillstring 11 that is shown disposed in a borehole 12 that penetrates at least one earth formation 14 for making measurements of properties of the formation 14 and/or the borehole 12 downhole. Drilling fluid, or drilling mud 16 may be pumped through the borehole 12. As described herein, "formations" refer to the various features and materials that may be encountered in a subsurface environment. Accordingly, it should be considered that while the term "formation" generally refers to geologic formations of interest, that the term "formations," as used herein, may, in some instances, include any geologic points or volumes of interest (such as a survey area).

As described herein, "logging" refers to the taking of formation property measurements. Examples of logging processes include measurement-while-drilling (MWD) and logging-while-drilling (LWD) processes, during which measurements of properties of the formations and/or the borehole are taken downhole during or shortly after drilling. The data retrieved during these processes may be transmitted to the surface, and may also be stored with the downhole tool for later retrieval. Other examples include logging measurements after drilling, wireline logging, and drop shot logging. As referred to herein, "downhole" or "down a borehole" refers to a location in a borehole away from a surface location at which the borehole begins.

A formation evaluation (FE) downhole measurement tool 18 may be disposed in the well logging system 10 at or near the downhole portion of the drillstring 11, and includes one or more of various types of sensors or receivers 20 to measure various properties of the formation 14 as the tool 18 is lowered down the borehole 12. Such sensors 20 include, for example, nuclear magnetic resonance (NMR) sensors, resistivity sensors, porosity sensors, gamma ray sensors, seismic receivers and others.

In one embodiment, the tool 18 may be inserted in the drillstring 11, and allowed to fall by gravity to a downhole position, or be pumped to the downhole position via the mud 16. In other embodiments, the tool 18 may be lowered by a wireline, inserted during a MWD or LWD process, or inserted downhole by any other suitable processes. In one embodiment, the tool 18 includes a communications assembly 22 for transmitting data and communication signals between the tool 18 and a remote processor. The communications assembly 22 may be part of any selected telemetry system, such as a wireline or wired pipe communication system or a wireless communication system including mud pulse telemetry and/or RF communication. In one embodiment, the communications assembly 22 includes at least one communication antenna 24 connected to the sensor 20.

In one embodiment, the tool 18 includes an electronics unit 26 for receiving data from and/or control of the tool 18. The electronics unit 26 may also control the communications assembly 22 for communicating with a remote processor. The sensor 20, the communications assembly 22 and/or the electronics unit 26 may be included in a common housing 28. With respect to the teachings herein, the housing 28 may represent any structure used to support at least one of the sensor 20, the communications assembly 22, and the electronics unit 26.

The tool 18 may be operably connected to a surface processing unit 30, which may act to control the sensor 20, and may also collect and process data generated by the sensor 20 during a logging process. In one embodiment, the surface processing unit 30, includes any number of transmitting and/or receiving antennas (not shown) to receive signals from, and/or send signals to, the communications assembly 22.

The surface processing unit 30 may also include components as necessary to provide for processing of data from the tool 18. Exemplary components include, without limitation, at least one processor, storage, memory, input devices, output devices and the like. As these components are known to those skilled in the art, these are not depicted in any detail herein.

Although the present embodiment provides the surface processing unit 30 to receive and process the frequency data, any number or types of processors, circuits or devices for controlling operation of the tool 18, processing data and/or communicating with the communications assembly 22 may be provided downhole. Such devices may include any suitable components, such as storage, memory, input devices, output devices and others.

Figure 2:
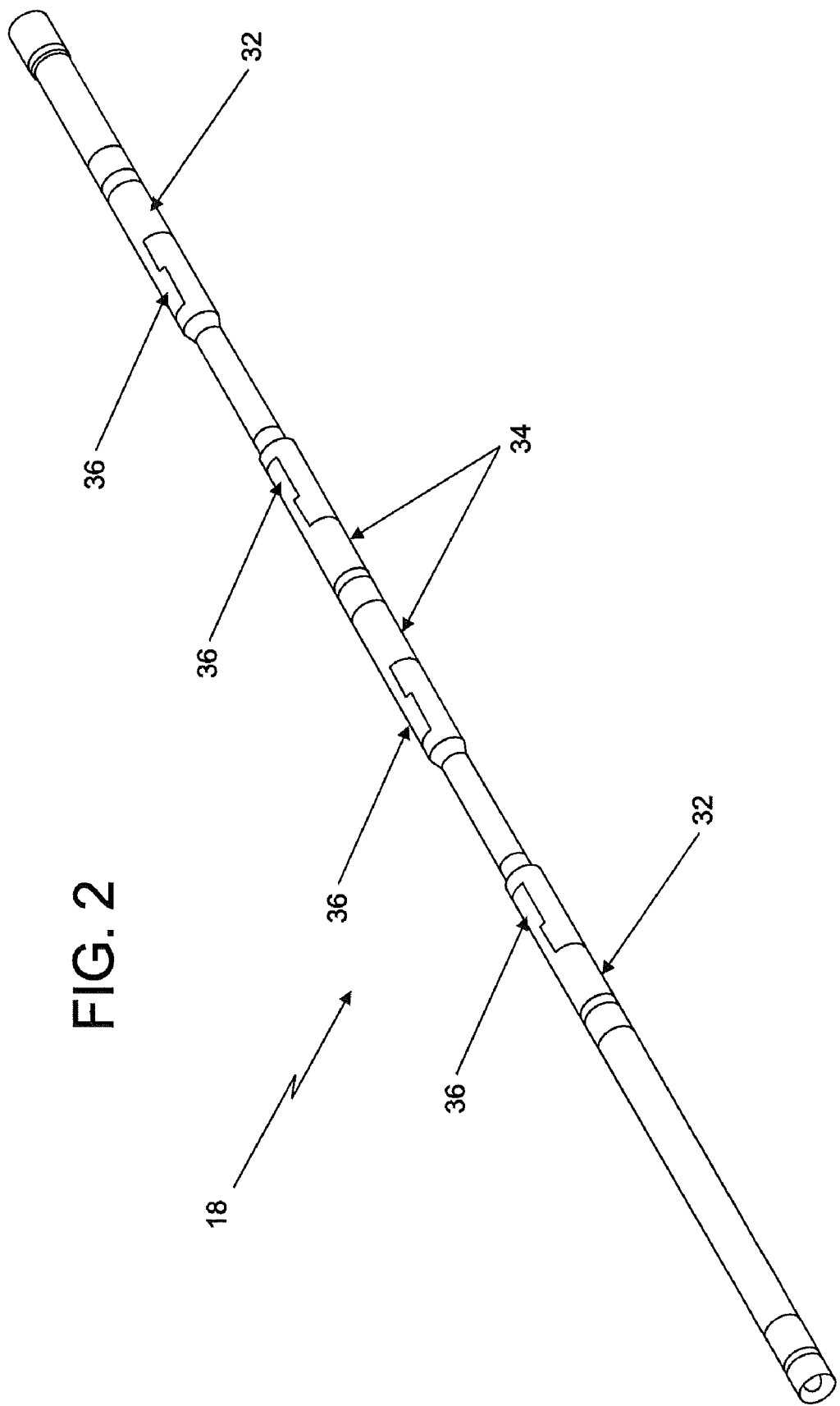
FIG. 2 depicts an exemplary embodiment of a measurement tool of FIG. 1.

Referring to FIG. 2, there is provided an exemplary embodiment of the measurement tool 18. The measurement tool 18 includes transmitting antennas 32 and receiving antennas 34. In one embodiment, the transmitting antennas 32 are used to inject electromagnetic signals into the borehole and the surrounding formation 14, and the receiving antennas 34 are used to receive the signals that return from the formation 14. These signals may be utilized to determine, for example, the amplitude attenuation or phase shift of the interrogating electromagnetic wave. Each antenna 32, 34 includes a respective electronics unit 36 to perform functions such as tuning. The antennas 32, 34 may be configured to operate at any desired frequency, such as 400 kHz and 2 MHz. The number and type of antennas shown in FIG. 2 is merely exemplary. Any suitable number and combination of antennas, including for example, transmitting antennas, receiving antennas, Z-antennas and X-antennas, may be incorporated in the tool 18.

Figure 3:
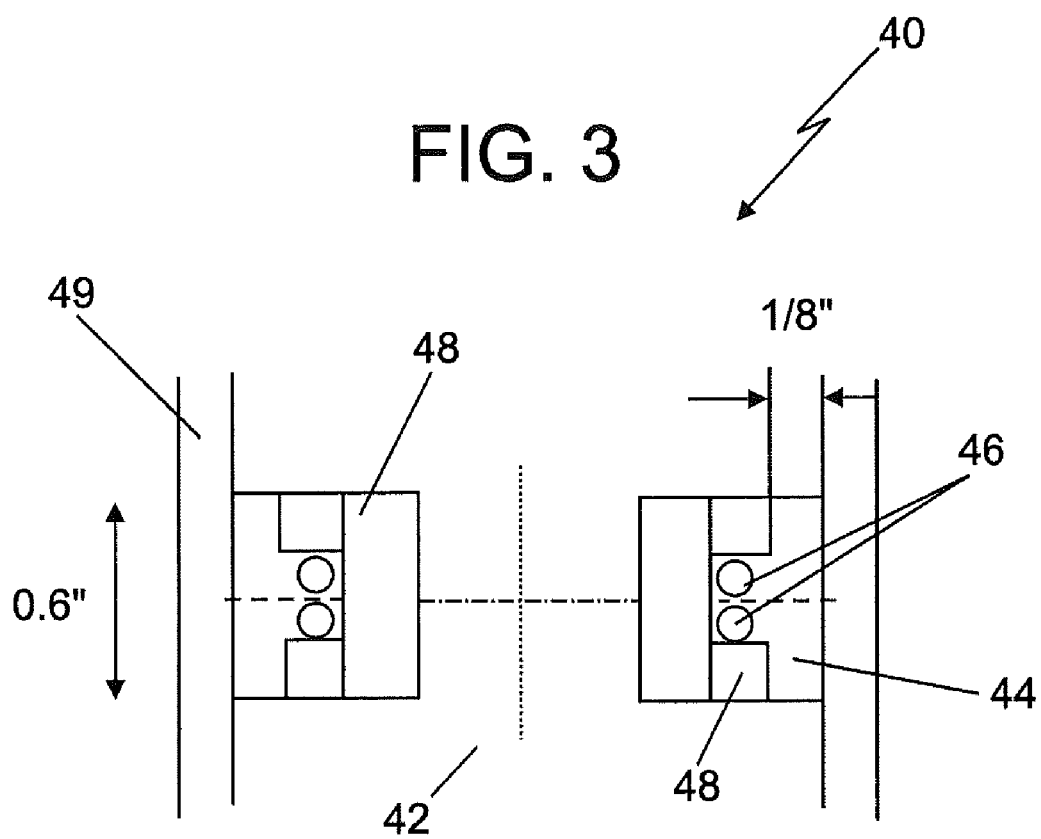
FIG. 3 depicts a side view of an exemplary embodiment of an antenna.

Referring to FIG. 3, an exemplary embodiment of an antenna 40 is shown. In this embodiment, the antenna 40 is a Z-antenna. The antenna 40 includes an elongated body 42 that includes one or more recesses or slots 44 disposed on a periphery of the elongated body 42. In these embodiments, each slot 44 extends along axial and circumferential directions relative to the elongated body 42. One or more coils 46 extends in a circumferential direction through each slot 44, and each slot has a "u-shaped" magnetically permeable material 48, such as a ferrite material, disposed between the coil 46 and an inner surface of the slot 44. In one embodiment, a protective cover 49, made of non-electrically conductive material, is disposed over the slot 44 to protect the slots 44 from fluid and to prevent fatigue. In one example, the non-conductive cover 49 is at least ⅛ inch thick. The cover 49 can be optionally designed as a separate piece for an easier replacement if it is worn away during the drilling process.

As used herein, the "axial" direction refers to a direction generally parallel to the longest axis of the elongated body. For Z-antennas, the axial direction is perpendicular to a plane formed by the coil, and for X-antennas, the axial direction is parallel to the plane formed by the coil. For Z-antennas, the axial direction is parallel to the direction of the magnetic flux relative to a point on the periphery of the elongated body, and for X-antennas, the axial direction is perpendicular to the direction of the magnetic flux. The "radial" direction refers to a direction perpendicular to the axial direction and extending from the periphery to the center of the elongated body. The "azimuthal" direction refers to a direction corresponding to a straight line that is perpendicular to the axial direction and perpendicular to the radial direction. It should be noted that, although embodiments presented herein describe a cylindrical elongated body, any elongated body having any suitable shape may be utilized. In other embodiments, the plane formed by the coil in the Z-antenna is at any selected angle relative to the longest axis of the elongated body.

Figure 4:
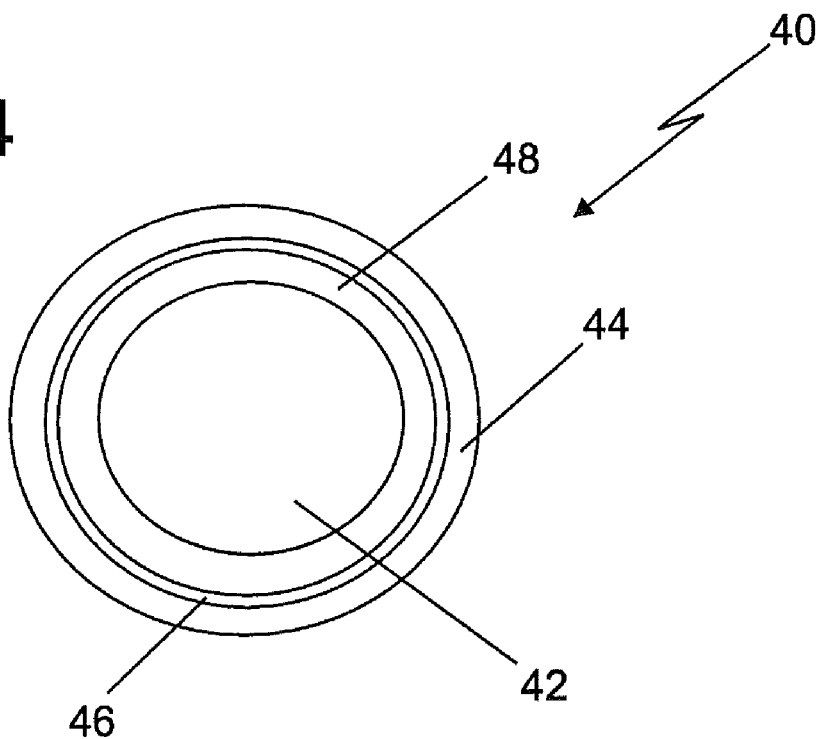
FIG. 4 depicts a top view of another exemplary embodiment of an antenna.

The number of slots 44 is not limited, and may be as few as a single circumferential slot 44 or a plurality of slots 44. In one embodiment, the slot 44 is a single slot extending in a circumferential direction completely around the periphery, as shown in FIG. 4. As shown in FIG. 3, the coil 46 includes two turns around the circumference of the elongated body 42, but may constitute a single turn or any desired number of turns. As used herein, "u-shaped" refers to a configuration that partially surrounds the coil 46, and has a first portion disposed on an interior surface of the slot, and two side portions on opposite ends of the first portion that extend in a radial direction toward the periphery of the elongated body 42. The signal strength increases when the u-shaped magnetic material 48 is filled into the slots 44 to guide the magnetic flux to flow either inward or outward.

In one embodiment, each slot 44 is a slim-cut or slim slot 44. As used herein, "slim" refers to a length of the slot 44 in the axial direction that is less than the axial length of prior art slots, which typically is about five inches. The slim slots 44 are less than five inches. In one embodiment, the axial length of each slot 44 is less than or equal to about one inch, for example, 0.4 inch or 0.6 inch as shown in FIG. 3. In one embodiment, the axial length is from 0.4 inch to one inch, which provides a sufficiently strong signal while the relatively short length of the resulting antenna 40 lends mechanical strength. In another embodiment, the u-shaped permeable material 48 extends in a radial direction so that the distance between the outermost surface of the u-shaped material 48 and the periphery of the elongated body 42 is about ⅛ inch or 0.125 inch.

Figure 5A:
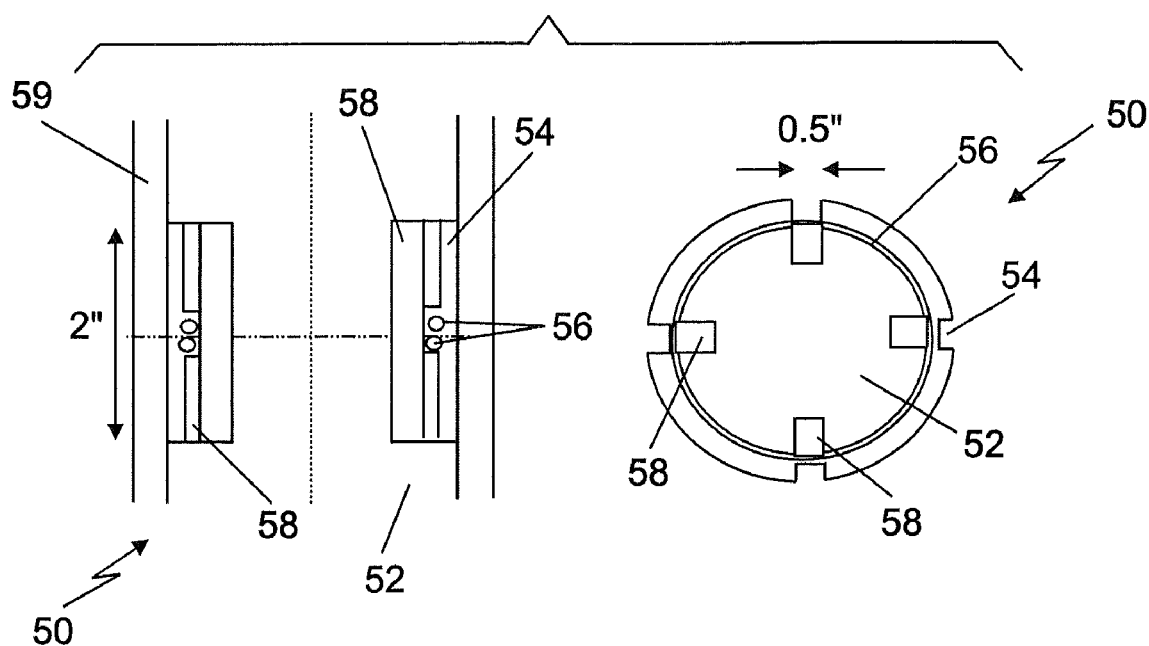
FIGS. 5a and 5b depict additional exemplary embodiments of an antenna.
Figure 5B:
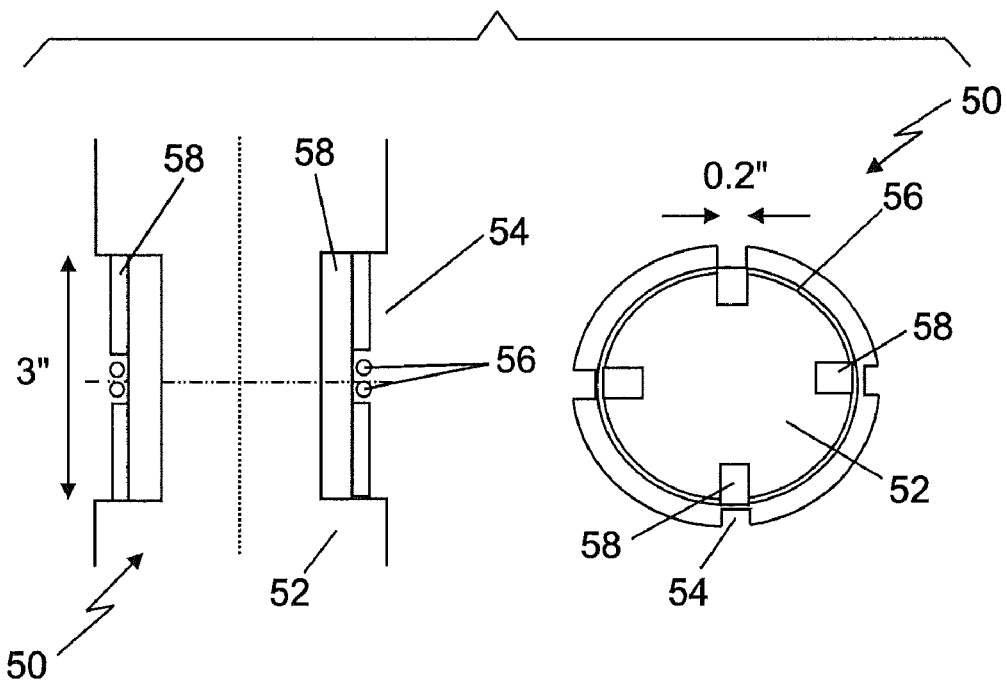

Referring to FIGS. 5a and 5b, additional embodiments of a Z-antenna 50 are shown. Antenna 50 includes an elongated body 52 having a plurality of slots 54. In one embodiment, the slots 54 are slim length slots. One or more coils 56 extend in a circumferential direction through each slot 54, and each slot 54 has a u-shaped magnetically permeable material 58, such as a ferrite material, disposed between the coil 56 and an inner surface of the slot 54. In one embodiment, a protective cover 59, made of non-conductive materials, is disposed over the slot 54.

As shown in FIGS. 5a and 5b, the coil 56 includes two turns around the circumference of the elongated body 52, but may constitute a single turn or any desired number of turns. In one embodiment, the antenna 50 has four slots 54, although any suitable number of slots 54 may be utilized, such as two slots 54 or a single circumferential slot 54. In the embodiment shown in FIG. 5a, the axial length of the slot 54 is approximately two inches, and the azimuthal length of the slot 54 is approximately 0.5 inch. In the embodiment shown in FIG. 5b, the axial length of the slot 54 is approximately three inches, and the azimuthal length of the slot 54 is approximately 0.2 inch. As shown in these embodiments, the axial length of the slots is reduced, and the total width of the slot is varied based on the axial length to preserve signal strength. In one embodiment, the depth of each slot in the radial direction is about 0.425 inch.

Figure 6A:
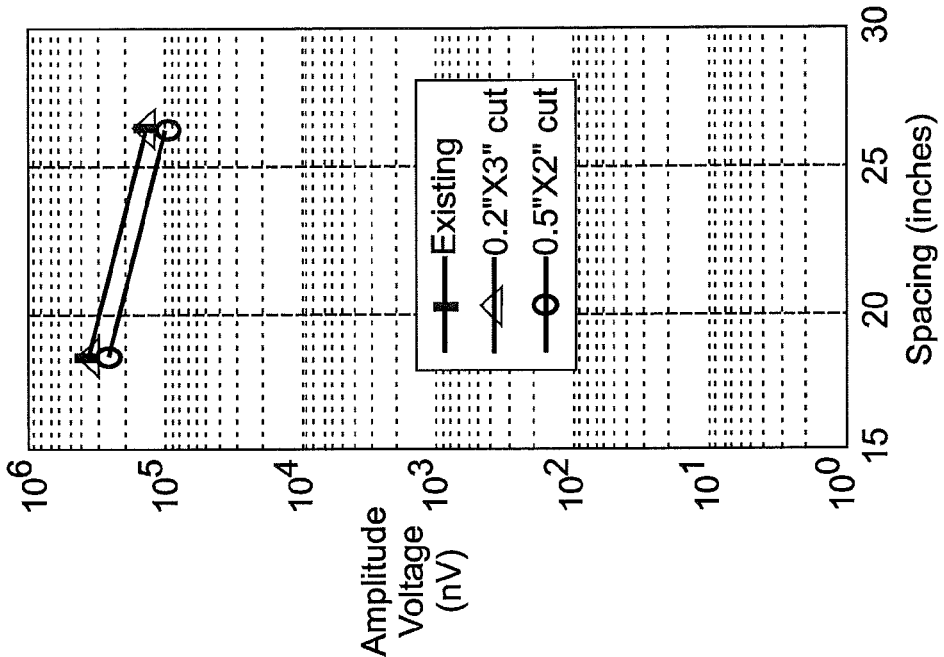
FIG. 6 depicts comparative signal strength measurements for a prior art antenna and the antennas of FIGS. 5a and 5b.
Figure 6B:
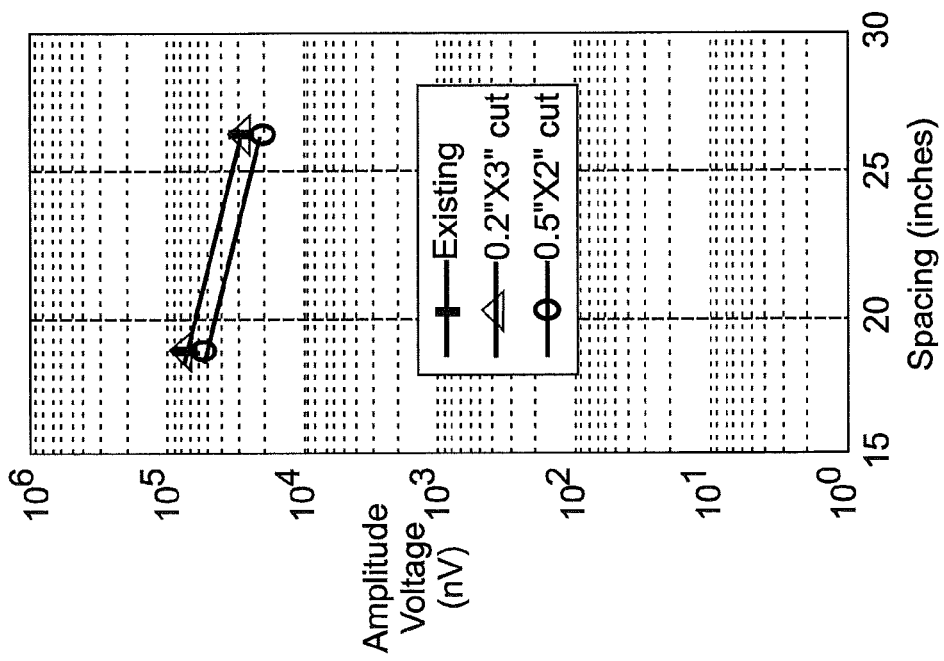

FIG. 6 shows a comparison of the signal strength for the embodiments of FIGS. 5a and 5b verses a prior art Z-antenna having sixteen slots, each of which is 0.125 inch in width (in the azimuth direction), five inches in length (in the axial direction of the antenna pipe), and 0.5512 inches in depth (along a radial direction of the pipe). The prior art Z-antenna is labeled "existing" in FIG. 6. As is evident from FIG. 6, the u-shaped configuration described herein provides comparable signal strength even with reduced numbers and axial lengths of the slots.

Referring to FIGS. 7a and 7b, an exemplary embodiment of an antenna 60 is shown. In this embodiment, the antenna 60 is in an X-antenna configuration. The antenna 60 includes an elongated body 62 that includes one or more recesses or slots 64 disposed on a periphery of the elongated body. In these embodiments, each slot 64 extends along axial and azimuthal directions relative to the elongated body 62. One or more coils 66 forms a closed path defining a plane parallel to the axis of the elongated body 62 and extends through each slot 64, and each slot has a u-shaped permeable material 68 disposed between the coil 66 and an inner surface of the slot 64. The number of slots 64 is not limited, and may be any desired number. In the embodiments shown in FIG. 7a and 7b, the antenna includes two slots 64, but may include any number of slots 64. As shown in FIGS. 7a and 7b, the coil 66 includes two turns around the closed path, but may constitute a single turn or any desired number of turns. The antenna 60, in one embodiment, includes an optional protective non-conductive cover 69.

In one embodiment, each slot 64 has an axial length of approximately five inches or less, and has an azimuth length of one inch or less. For example, FIG. 7a illustrates an embodiment with each slot 64 having a five inch axial length and a 0.8 inch azimuth length, and FIG. 7b illustrates an embodiment with each slot 64 having a 3.5 inch axial length and a one inch azimuth length. Other embodiments include slots 64 having an azimuth length of one inch or less, such as 0.6 inch.

Figure 8A:
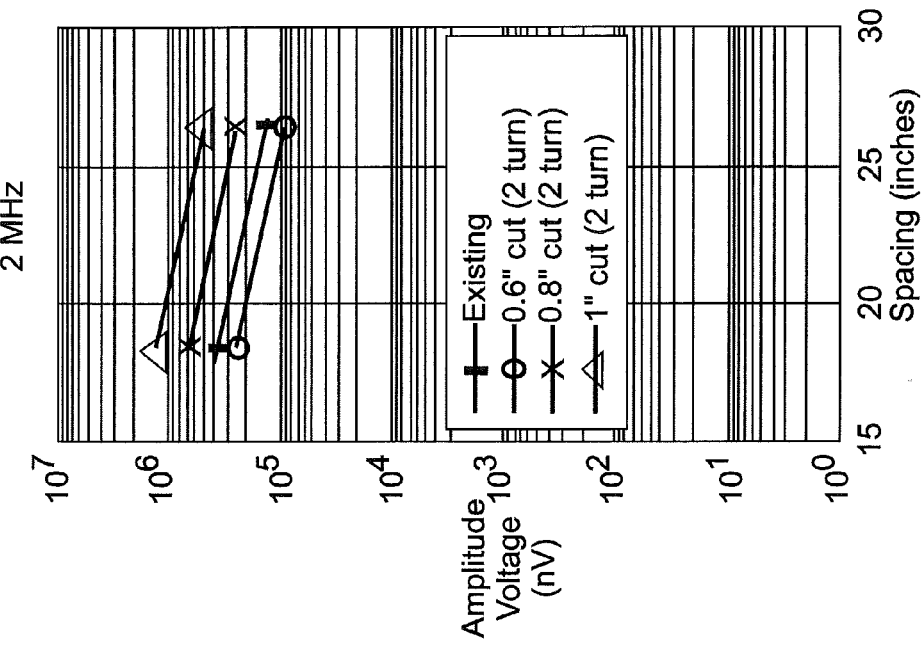
FIG. 8 depicts comparative signal strength measurements for a prior art antenna and the antennas of FIGS. 7a and 7b.
Figure 8B:
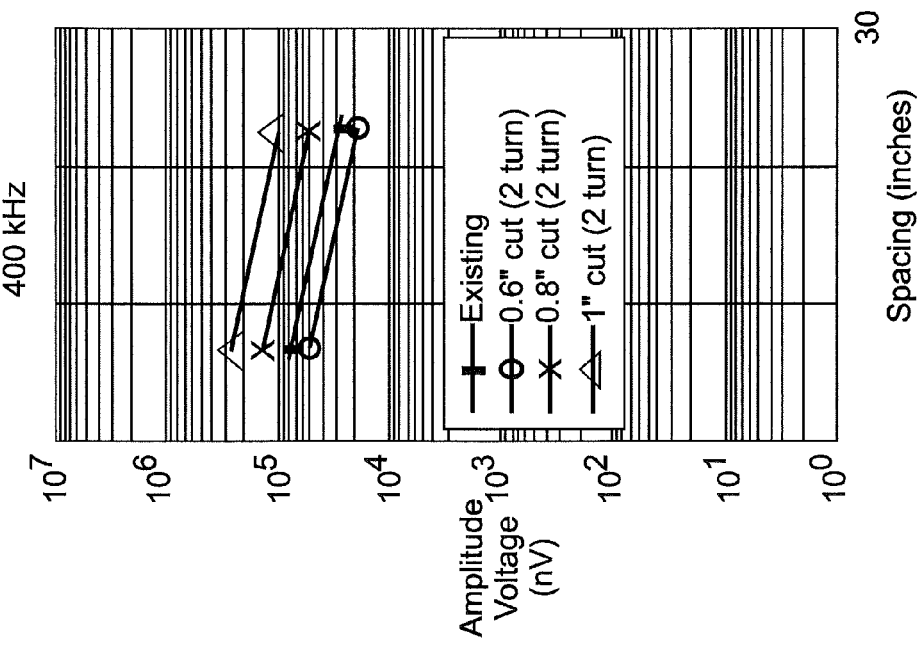

Referring to FIG. 8, exemplary dimensions are described and evaluated as compared to a prior art Z-antenna, which is labeled "existing", and such evaluation is used to determine preferred axial lengths of the X-antenna slots 64 based on various azimuthal lengths. The graph shown in FIG. 8 illustrates calculations of signal strength versus slot spacing, for the prior art Z-antenna, and embodiments of the Z-antenna described herein having axial slot lengths of 0.6 inch, 0.8 inch and one inch, respectively. Signal strengths are measured for 400 kHz and 2 MHz frequencies. To estimate the axial length of a slot 64 for an X-antenna, the relationship between the prior art Z-antenna and signal measurements from embodiments of the Z-antennas 40 and/or 50 of different axial lengths is used.

In this example, the radius of the elongated body (a tool pipe in this example) is 3.375 inch. Since three turns are generally used in prior art X-antennas, a factor of three should be considered. In one embodiment, in order to minimize the length, a factor of 4 can be achieved by a pre-amplifier. In the 0.6 inch measurement, the total length of the slot for the Z-antenna is the perimeter of the antenna, which is 2*π* (3.375 inches)=21.2 inches. For a X-antenna, two oppositely located slots are cut into the elongated body. Thus, for the 0.6 inch azimuthal cut X-antenna, the axial length will be [(21.2 inches)/2]*¾=8 inches. For a 0.8 inch azimuthal cut X-antenna, the signal is about 2.5 times of the prior art signal. Thus, the length can be calculated as [[(21.2 inches)/2]/sqrt(2.5)]*¾=5 inches. The same operation can be applied to a one-inch azimuthal cut X-antenna, for which the signal is about 5 times that of the reference signal. The length thus will be [[(21.2 inches)/2]/sqrt(5)]*¾=3.5 inches. In this example, the square root (sqrt) is used because of the use of both transmitter and receiver antennas in the simulations.

Referring to FIGS. 9 and 10, embodiments of an antenna are shown that extend the single antenna designs to a two- or three-component collocated antenna. During a LWD process, the tool 18 is continually rotating. Thus, a two-component collocated antenna as shown in FIG. 9 is possible for obtaining all components out of full tensor measurements except the XY component. FIG. 10 shows two design options for a three-component collocated antenna when the XY component is needed. Although these embodiments are described as having specific numbers of slots and coils, and specific dimensions, such numbers and dimensions are merely exemplary and may be adjusted as desired.

Figures 9A, 9B:
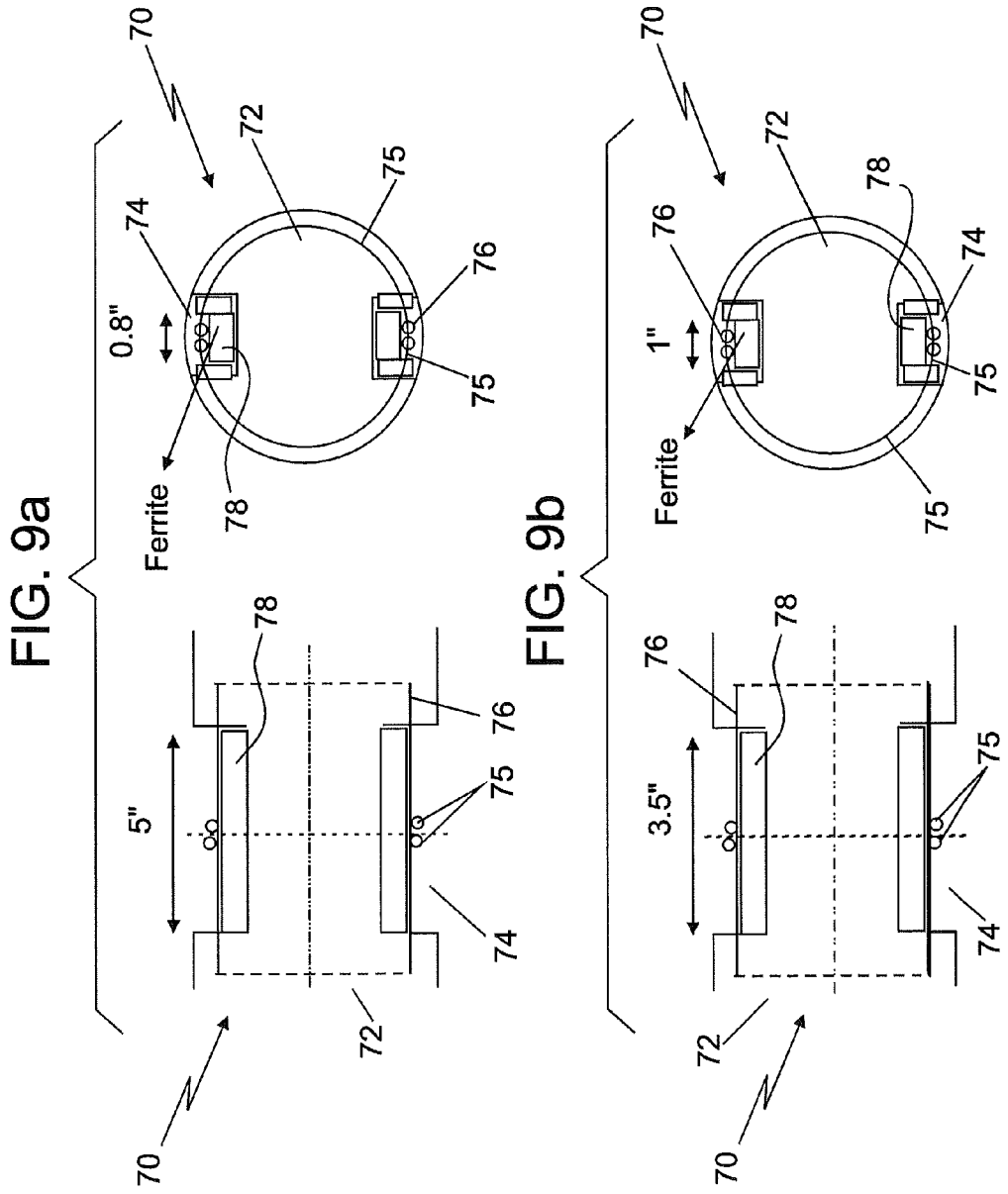
FIGS. 9a and 9b depict exemplary embodiments of an assembly including multiple co-located antennas.

Referring to FIGS. 9a and 9b, an antenna assembly 70 is shown that includes an elongated body 72 having a pair of slots 74 disposed on a periphery of the elongated body 72. In these embodiments, each slot 74 extends along axial and azimuthal directions relative to the elongated body 72. One or more coils 76 forms a closed path defining a plane parallel to the axis of the elongated body 72 and extends through each slot 74, and each slot has a u-shaped permeable material 78 disposed between the coil 76 and an inner surface of the slot 74. The antenna assembly 70 also includes additional coils 75 that extend around the periphery of the elongated body 72 in a circumferential direction. In the embodiment shown in FIG. 9a, each slot has an axial length of about five inches and an azimuth length of about 0.8 inch. In the embodiment shown in FIG. 9b, each slot 74 has an axial length of about 3.5 inches and an azimuth length of about one inch.

Referring to FIGS. 10a and 10b, in this embodiment the antenna assembly 70 includes an additional pair of slots 73, each including additional u-shaped permeable material 77, and additional coils 79, which also form a loop in a plane parallel to the axis of the elongated body 72. In the embodiment shown in FIG. 10a, each slot 73, 74 has an axial length of about five inches and an azimuth length of about 0.8 inch. In the embodiment shown in FIG. 10b, each slot 73, 74 has an axial length of about 3.5 inches and an azimuth length of about one inch.

In the above examples shown in FIGS. 9 and 10, the slots 74 are configured according to an X-antenna configuration. In other embodiments, the slots 74 are configured in a Z-antenna configuration.

In order to evaluate the efficiency of different antenna designs, the signal strength from one transmitter to two receivers for a prior art Z-antenna is measured for comparison with antennas having various modifications. The impact on signal strength of various characteristics of different embodiments of the antennas described herein is shown, compared to a prior art Z-antenna. Such characteristics include the reduced length of an antenna, the effective cross area, the magnetic permeability of filled material, the shape of the material, the depth of cutting, and the number of turns of coil. These impacts are shown to demonstrate how various characteristics can be modified to compensate for the reduced length of the antennas described herein relative to prior art antennas.

Referring to FIGS. 11-16, the prior art Z-antenna described includes slots having an azimuthal length of 0.125 inch in width, an axial length of five inches, and a radial depth of 0.5512 inch. The prior art Z-antenna is labeled "existing" in the graphs of FIGS. 11-16.

Figure 11B:
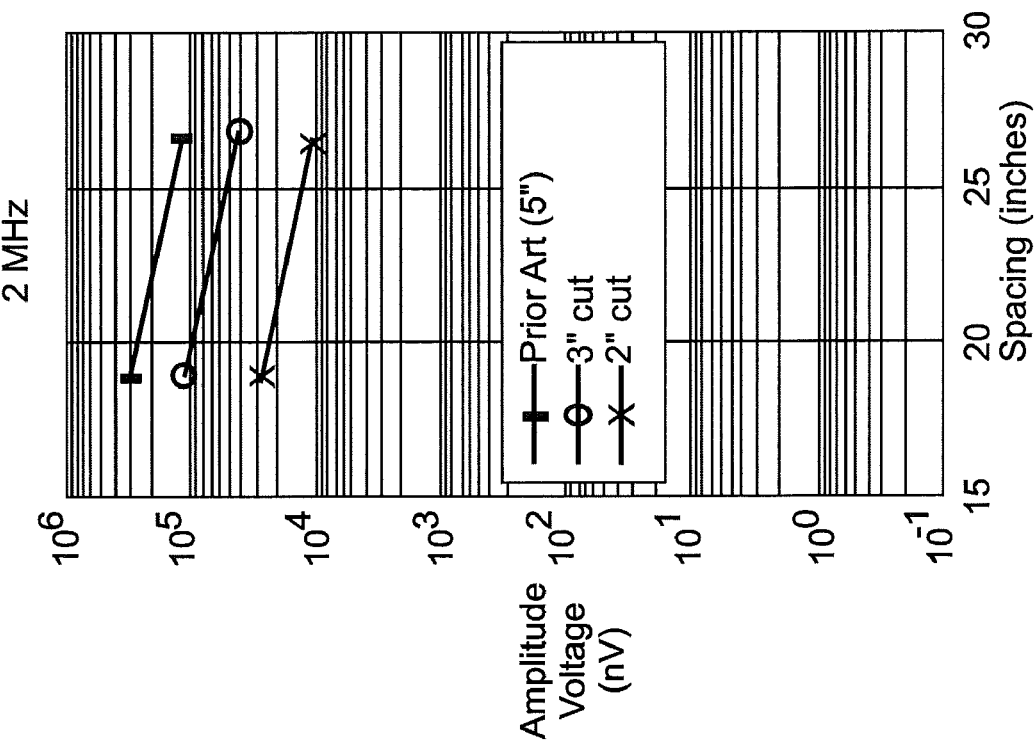
FIG. 11 depicts comparative signal strength measurements showing effects of slot lengths on signal strength.
Figure 11A:
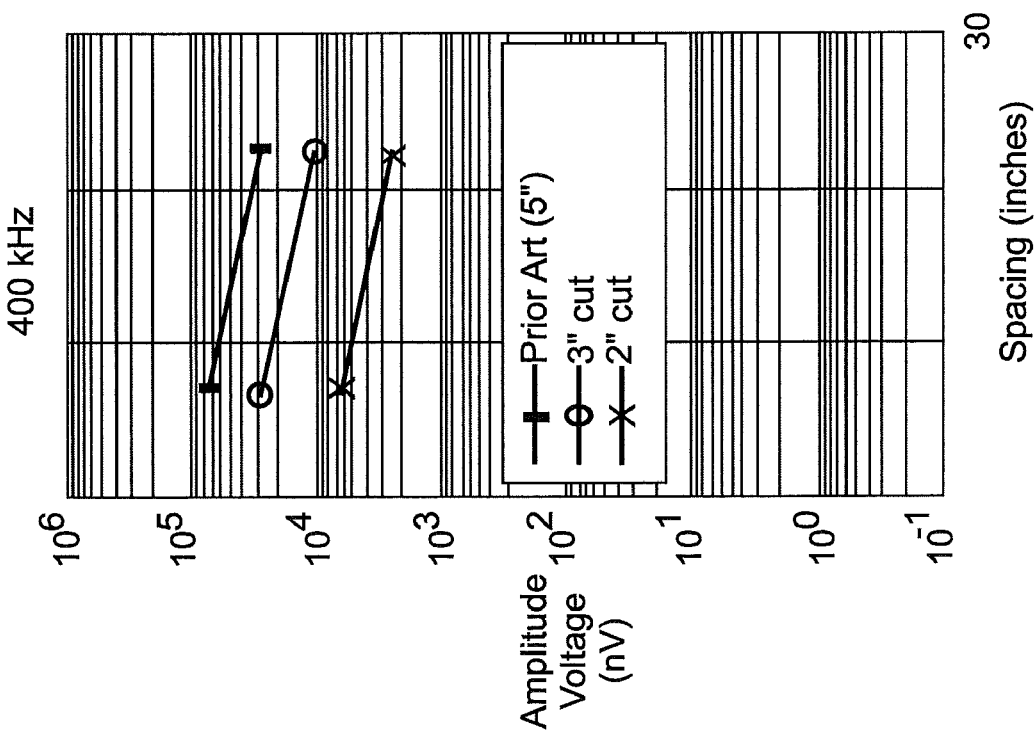

Referring to FIG. 11, the effects of shortening slot lengths for an antenna is shown. FIG. 11 shows signal strength relative to slot spacing for the prior art antenna having five inch axial slots, an antenna having three-inch slots, and an antenna having two-inch slots. As demonstrated in FIG. 11, absence of other factors, a reduction in the slot's axial length corresponds to a reduction in signal strength. Furthermore, the signal strength is not linearly proportional to the permeability when the length of path along the magnetic flux direction is not long enough. The effective permeability becomes smaller when the path is cut shorter.

Various characteristics of the antenna described herein counteract the relationship between slot length and signal strength to provide for a signal strength that is comparable to or greater than prior art antenna signal strengths. Various combinations of the characteristics described below may be used to increase signal strength.

Figure 12A:
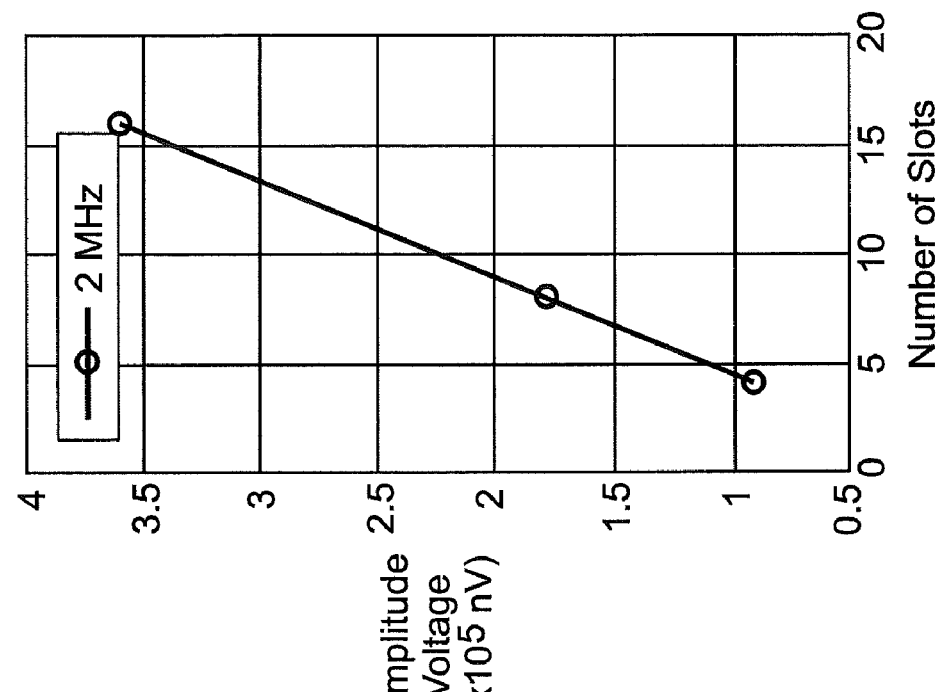
FIG. 12 depicts comparative signal strength measurements showing effects of increases in effective cross area on signal strength.
Figure 12B:
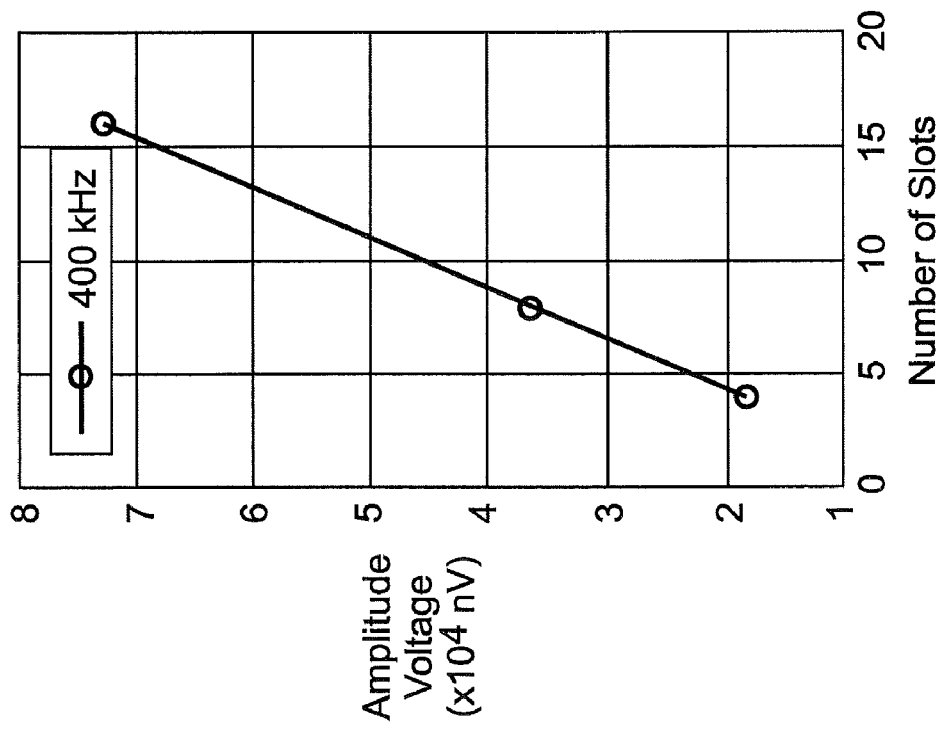

Referring to FIG. 12, the effects of an increase in the effective cross area is shown. The cross area is the non-metallic area in the plane defined by the coil, defined by the slots, that is perpendicular to the magnetic flux. The effective cross area provides an open path for the magnetic flux to flow. The larger the effective cross area, the stronger the signal will be. FIG. 12 shows the variation of signal strength with the number of slots used in receiver antennas while keeping the cross area of each slot unchanged. As is evident from FIG. 12, the signal strength is linearly proportional to the effective cross area.

Figure 13A:
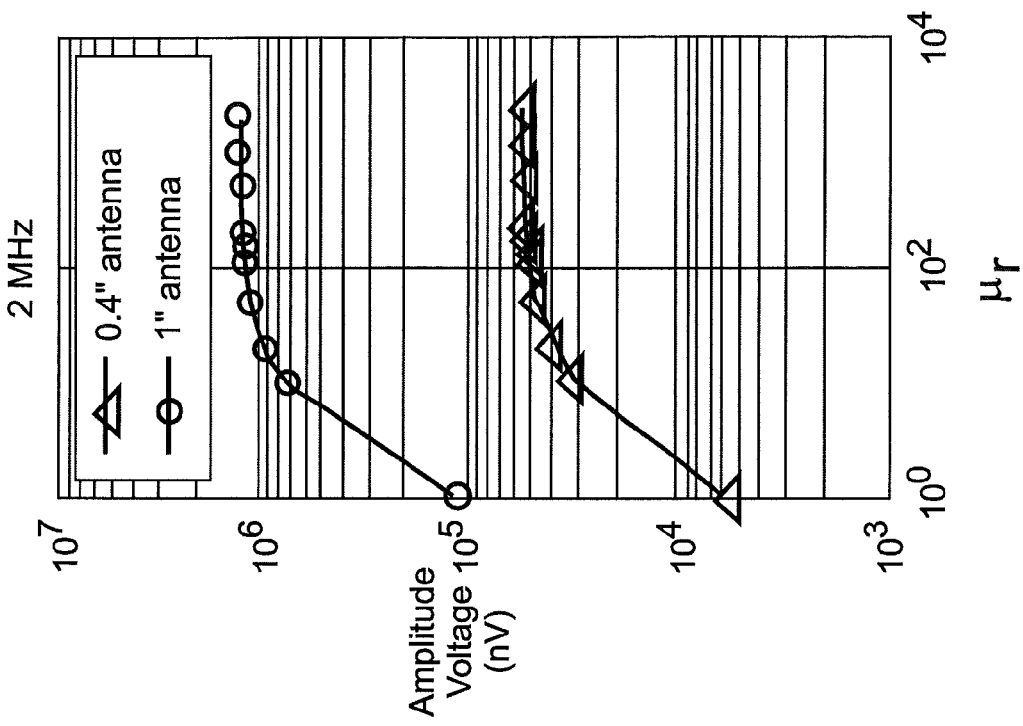
FIG. 13 depicts comparative signal strength measurements showing effects of magnetic permeability of filled material on signal strength.
Figure 13B:
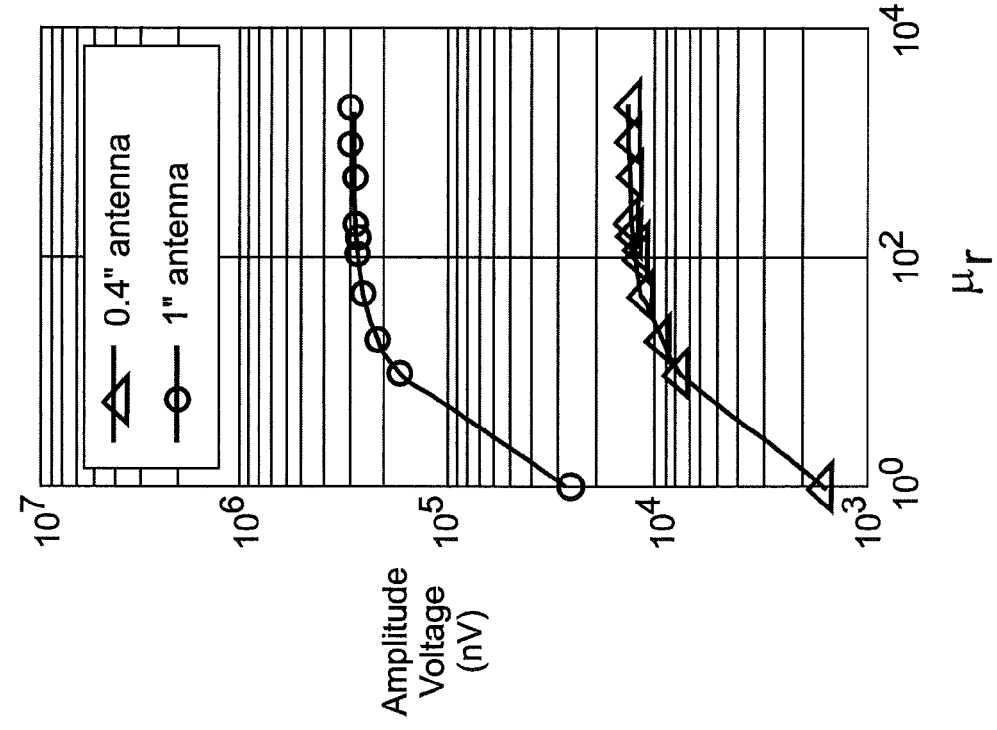

Referring to FIG. 13, the effects of the magnetic permeability of filled material are shown. Usually, high magnetically permeable materials are used to attract the magnetic flux so that the efficiency of the antenna is improved. FIG. 13 shows the variation of the signal strength with the relative permeability of filled material, i.e., the ratio of the permeability of the filled material to the permeability of free space, for the circumferential antennas of two different cut lengths (0.4 inch and one inch). As shown in FIG. 13, the signal strength increases with the increase in magnetic permeability and saturates after a certain value. For a ferrite material with a relative-magnetic-permeability ($\mu_r$) of 125, the signal is saturated. In other words, there is no need to use a higher magnetic permeability material. FIG. 13 demonstrates a saturation of the signal when $\mu_r$ is greater than or equal to approximately 100.

Figure 14A:
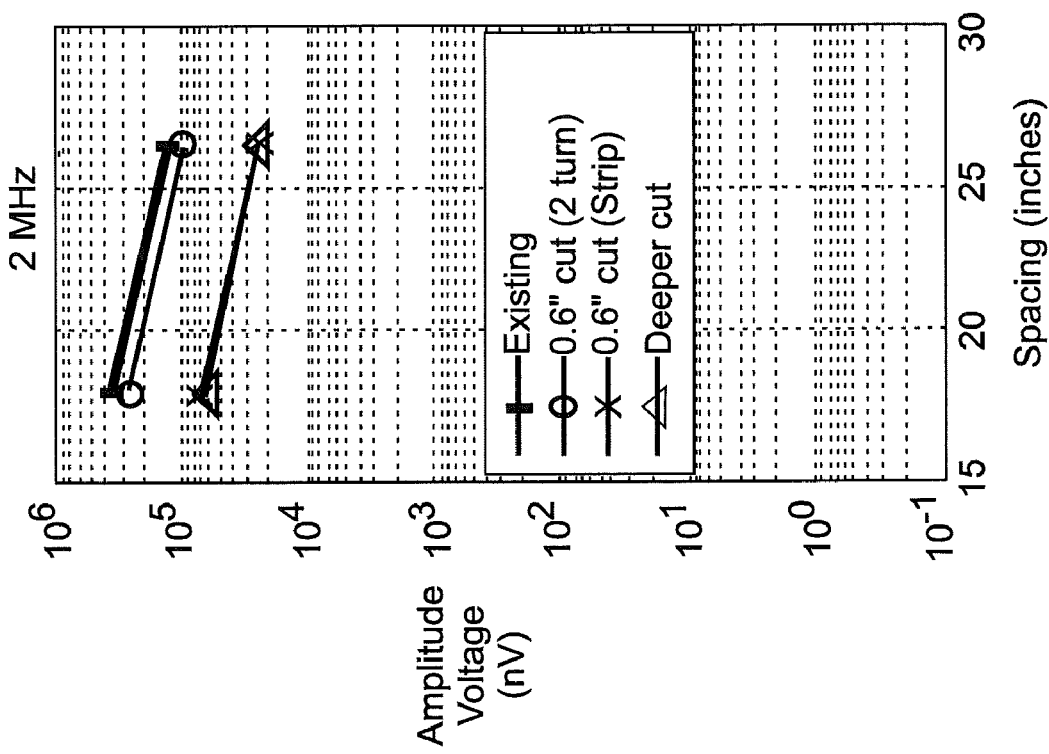
FIG. 14 depicts comparative signal strength measurements showing effects of shape and position of filled material on signal strength.
Figure 14B:
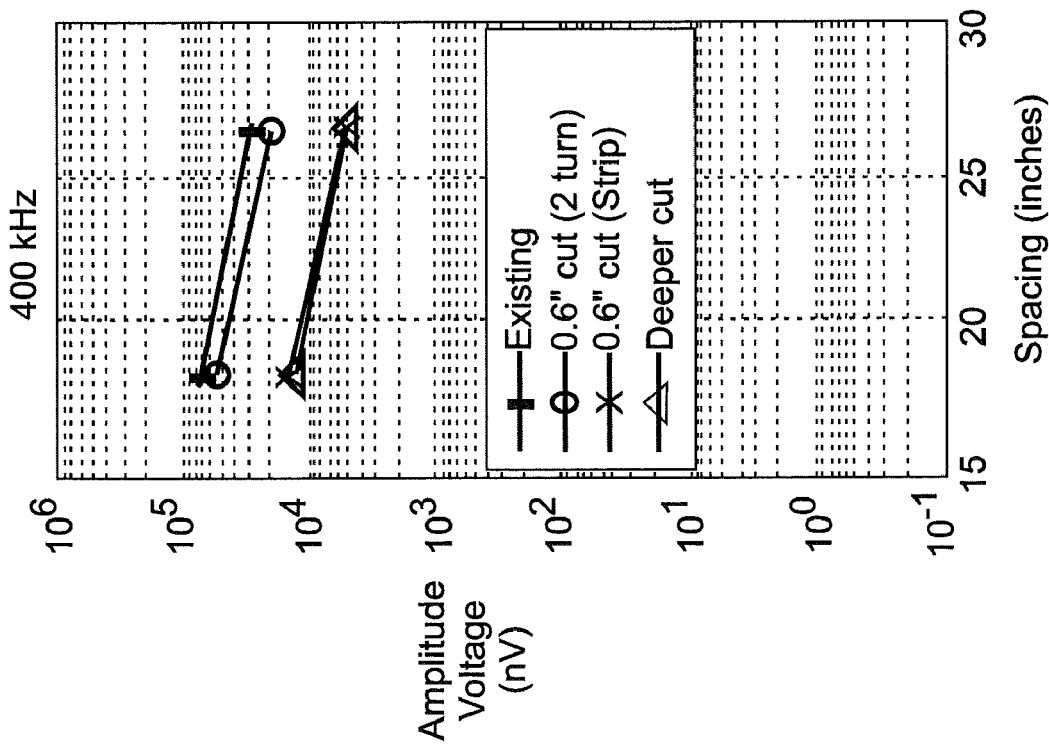

Referring to FIG. 14, the effects of the shape and position of the filled magnetically permeable material is shown. FIG. 14 shows the signal strength for the prior art "existing" antenna, as well as for antennas having a u-shaped magnetically permeable material. FIG. 14 shows signal strengths for design options including a slot having a radial depth similar to prior art slots (labeled "Deeper cut"), a slot having a shallow cut so that the u-shaped magnetically permeable material is close to the periphery, such as ⅛ inch (labeled "0.6 inch cut (Strip)"), and a slot having the shallow cut, u-shaped material and two coil turns (labeled "0.6 inch cut (2 turn)"). As shown herein, to counteract the reduction in signal strength, the u-shaped material and multiple turns increases the signal strength. The use of u-shape magnetically permeable material makes it feasible to design a slim cut (in the magnetic flux direction) antenna. The signal strength becomes stronger when the filled magnetic material and the coil(s) are closer to the collar surface.

Figure 15:
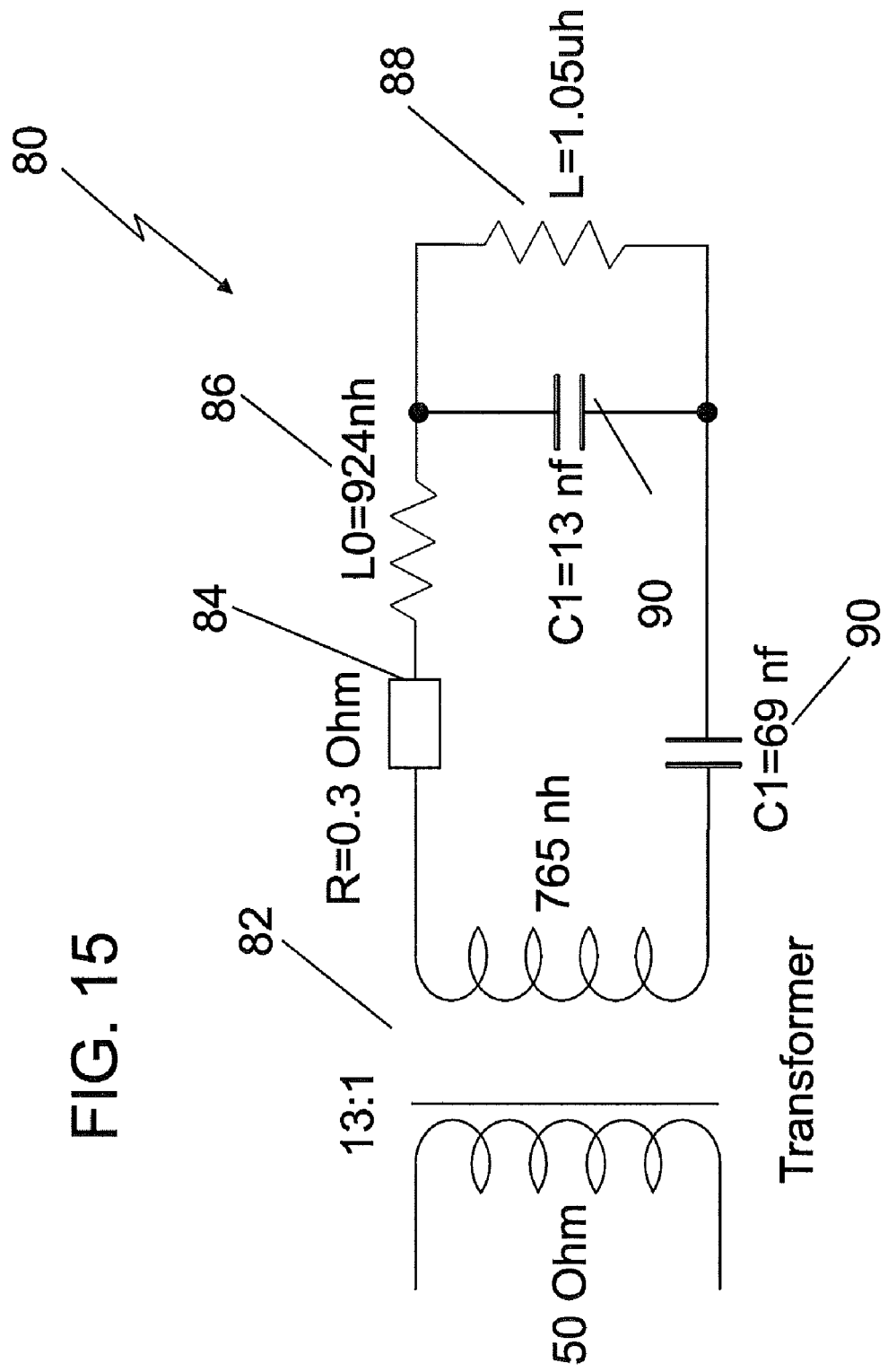
FIG. 15 depicts a diagram of an antenna tuning circuit.

Referring to FIGS. 14 and 15, the effects of the number of turns on the antenna is shown. In general, for a fixed voltage input, increasing the number of turns without any special treatment would not increase the magnetic moment and associated magnetic field, since the impedance is proportionally increased. Accordingly, in one embodiment, a tuning circuit 80 is coupled to the coil to allow the voltage in the coil to increase when multiple turns are utilized. The tuning circuit can thus be used to tune the antenna to yield a maximum current in the antenna loop.

The tuning circuit 80 includes a transformer 82 used to match the impedance of the tuning circuit 80 to the coil to reduce voltage reflection for high frequency measurements. When a resonance condition is reached between the tuning circuit 80 and the coil, the pure resistance comes from both coil resistance and tuning circuit residual resistance including the transformer 82. However, the larger part of the resistance is from the tuning circuit 80. Accordingly, the resonance current in the antenna loop is almost unchanged in response to the number of turns, allowing the tuning circuit to provide an increased current. In the example shown in FIG. 14, resistance 84 is the total pure resistance "R" whereas the resistance for the antenna loop is about 0.05 Ohm. Exemplary components of the tuning circuit 80 include the coil loop inductance 86, as well as an additional inductor 88 and capacitors 90. The values described in this example are not limiting.

Figure 16A:
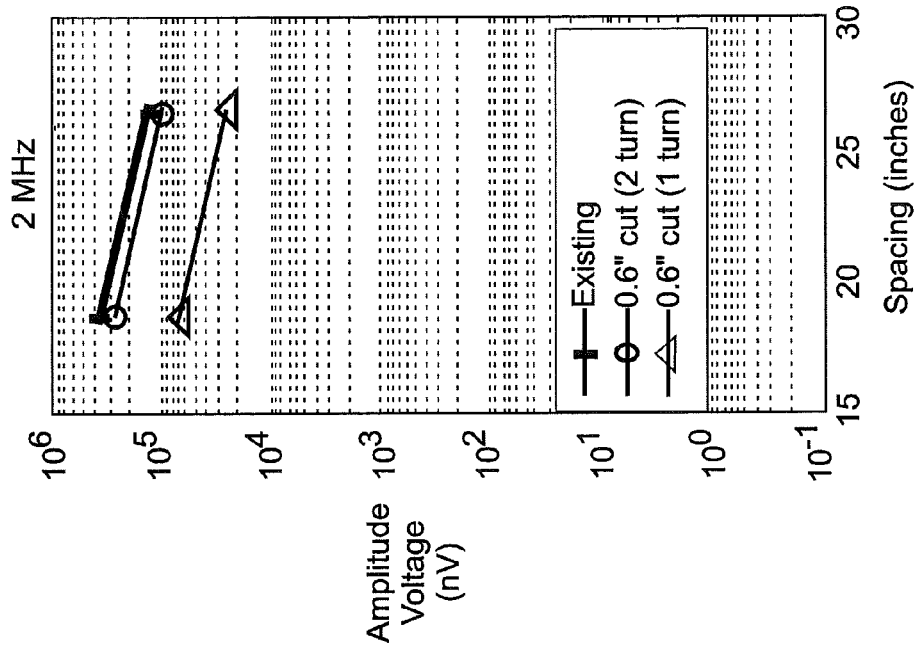
FIG. 16 depicts comparative signal strength measurements showing effects of the number of turns of the coil on signal strength.
Figure 16B:
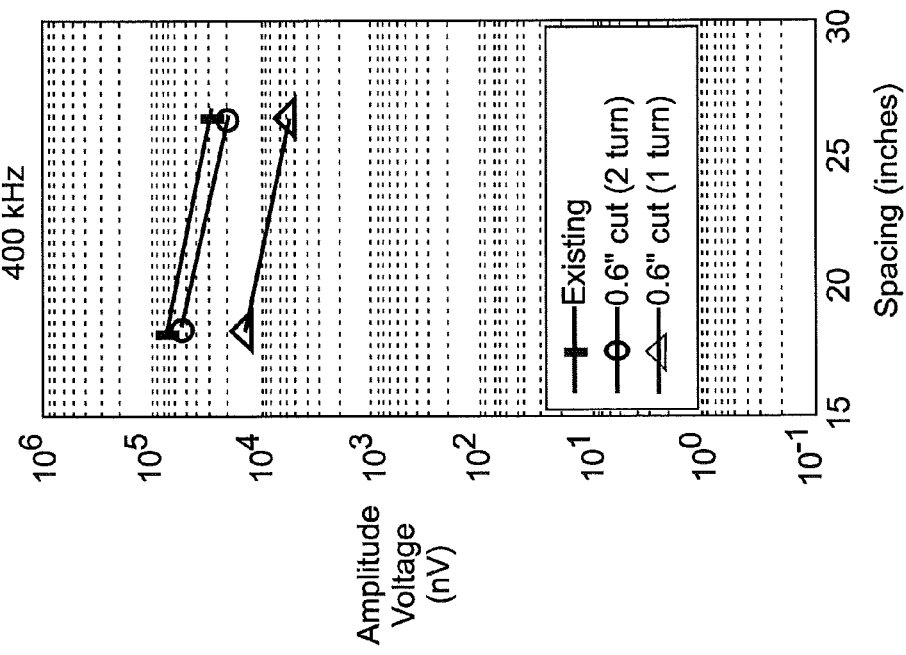

Referring to FIG. 16, the signal strength versus the number of turns is shown. As is evident from FIG. 16, adding turns to an antenna significantly increases the signal strength. In this example, the signal strength for a two-turn antenna (labeled "0.6 inch cut (2 turn)") is almost four times that of a single turn antenna ("0.6 inch cut (1 turn)").

The systems and methods described herein provide various advantages over existing processing methods and devices. The antennas described herein exhibit a reduction in size and manufacturing cost, and thereby save space for easier arrangement of multiple antennas, while keeping a similar or better antenna performance comparing to prior art antennas, such as the existing "slots" design as in MPR (Z-antenna) and APR (X-antenna) type tools. Shortening an antenna can also provide more flexibility in combining different antennas.

Another benefit of shortening the antennas is the possible reduction of the manufacturing costs. For example, a single circumferential cut, or a reduced number of slots can be manufactured more quickly and easily than prior art antennas that typically include sixteen slots.

For X-antenna configurations, for example, the antenna described herein can be designed to be significantly shorter than prior art X-antennas. Prior art antennas typically include sixteen slots of 0.125" width deployed along the pipe on opposite sides, and are generally about one foot long. Embodiments of the X-antennas described herein are significantly shorter, as they include fewer slots and shorter axial lengths. Furthermore, use of the antennas described herein, particularly the X-antennnas described herein, makes it possible to design a collocated multi-component antenna. Any workable X-antenna can be modified according to the embodiments described herein to add a Z-component by circumferentially wiring additional coil(s).

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. An apparatus for measuring one or more earth formation properties during applications including formation evaluation and geosteering, the apparatus comprising:
    an elongated body having an axis extending along a length of the elongated body;
    at least one recessed portion on a periphery of the elongated body;
    an electrically conductive coil forming a closed loop, at least a portion of the coil extending through the at least one recessed portion; and
    a u-shaped magnetically permeable and non-conductive material disposed between the coil and the at least one recessed portion, the u-shaped material partially surrounding the coil in the at least one recessed portion, the u-shaped material having side portions that extend parallel to a radial direction from the axis toward the periphery of the elongated body.

2. The apparatus of claim 1, wherein the recessed portion has a length in a direction parallel to a magnetic flux direction of less than five inches.

3. The apparatus of claim 2, wherein the recessed portion has a length in the direction parallel to the magnetic flux direction of less than or equal to approximately one inch.

4. The apparatus of claim 1, wherein the coil includes a plurality of turns.

5. The apparatus of claim 1, wherein the magnetically permeable material has a relative permeability of at least 100.

6. The apparatus of claim 1, wherein the coil forms a plane at a selected angle relative to a longest axis of the elongated body, and the at least one recessed portion is at least one slot extending in a circumferential direction relative to a periphery of the elongated body.

7. The apparatus of claim 6, wherein the plane is perpendicular to the longest axis.

8. The apparatus of claim 6, wherein the recessed portion is a single slot extending around the entirety of the periphery.

9. The apparatus of claim 1, wherein the coil forms a plane parallel to a longest axis of the elongated body, the at least one recessed portion is at least one slot extending along an azimuthal direction, the azimuthal direction corresponding to a straight line perpendicular to the longest axis and perpendicular to a radial direction of the elongated body.

10. The apparatus of claim 9, wherein the at least one recessed portion is one or more pairs of recessed portions, each pair located on an opposite side of the elongated body relative to the longest axis.

11. The apparatus of claim 10, further comprising an additional coil that forms a plane perpendicular to the longest axis of the elongated body.

12. The apparatus of claim 1, wherein the magnetically permeable material is a ferrite material.

13. The apparatus of claim 1, further comprising a non-conductive cover disposed on an exterior of the elongated body and surrounding the at least one recess.

14. A system for measuring one or more properties of an earth formation, the system comprising;
    a drillstring configured to support a drilling device; and
    a measurement tool disposed on the drillstring and including at least one antenna, the antenna including:
    an elongated body having an axis extending along a length of the elongated body;
    at least one recessed portion on a periphery of the elongated body;
    an electrically conductive coil forming a closed loop, at least a portion of the coil extending through the at least one recessed portion; and a u-shaped magnetically permeable and non-conductive material disposed between the coil and the at least one recessed portion, the u-shaped material partially surrounding the coil in the at least one recessed portion, the u-shaped material having side portions that extend parallel to a radial direction from the axis toward the periphery of the elongated body.

15. The system of claim 14, wherein the recessed portion has a length in a direction parallel to a magnetic flux direction of less than five inches.

16. The system of claim 14, wherein the coil includes a plurality of turns.

17. The system of claim 14, wherein the magnetically permeable material has a relative permeability of at least 100.

18. The system of claim 14, wherein the antenna is selected from at least one of a Z-type antenna and an X-type antenna.

19. The system of claim 14, wherein the at least one antenna is selected from at least one of: a transmitter for injecting an electromagnetic signal into the earth formation, and a receiver for receiving a signal return from the earth formation.

20. The system of claim 14, wherein the system is a logging-while-drilling measurement system.

* * * * *